United States Patent [19]
Andersson

[11] Patent Number: 5,335,356
[45] Date of Patent: Aug. 2, 1994

[54] ADAPTIVE RESOURCE ALLOCATION IN A MOBILE TELEPHONE SYSTEM

[75] Inventor: Hans E. Andersson, Vreta Kloster, Sweden

[73] Assignee: Telefonaktiebolaget L M Ericsson, Stockholm, Sweden

[21] Appl. No.: 755,148

[22] Filed: Sep. 5, 1991

[51] Int. Cl.[5] ............................................... H04B 7/01
[52] U.S. Cl. .................................. 455/54.1; 455/67.1; 455/226.1; 455/33.1; 379/58
[58] Field of Search ..................... 455/33.1, 33.2, 33.3, 455/33.4, 54.1, 54.2, 55.1, 56.1, 62, 67.1, 67.2, 67.3, 67.4, 67.5, 67.6, 67.7, 226.1, 226.2, 226.3; 379/60, 58

[56] References Cited

U.S. PATENT DOCUMENTS

| | | | |
|---|---|---|---|
| 4,009,346 | 2/1977 | Parker et al. | 179/15 AQ |
| 4,313,196 | 1/1982 | Oblonsky | 370/85 |
| 4,545,071 | 10/1985 | Freeburg | 455/33 |
| 4,556,760 | 12/1985 | Goldman | 179/2 EB |
| 4,654,879 | 3/1987 | Goldman et al. | 455/33 |
| 4,718,081 | 1/1988 | Brenig | 379/60 |
| 4,765,753 | 8/1988 | Schmidt | 379/60 |
| 4,771,425 | 9/1988 | Baran et al. | 370/85 |
| 4,811,421 | 3/1989 | Havel et al. | 455/67.1 |
| 4,819,228 | 4/1989 | Baran et al. | 370/85 |

OTHER PUBLICATIONS

Patent Abstracts of Japan, vol. 015, No. 295 (E-1094), Jul. 26, 1991 & JP-A-31 04 330 (NTT).
38th IEEE Vehicular Technology Conference, Jun. 1988, Philadelphia, US, pp. 340-343; Munoz-Rodriguez et al., "Forecasting Techniques in Call Hand-offs for Cellular Communication."

Primary Examiner—Reinhard J. Eisenzopf
Assistant Examiner—Philip J. Sobutka
Attorney, Agent, or Firm—Burns, Doane, Swecker & Mathis

[57] ABSTRACT

Transmission quality of an ongoing call in a mobile radiotelephone system is monitored by measuring parameters indicative of transmission quality, evaluating transmission quality according to the measured parameters, repeatedly measuring the aforementioned parameters at intervals, and repeatedly evaluating transmission quality according to the measured parameters at a time interval variable according to the results of the previous evaluation. Effectively, the calls in progress are divided into different classes according to transmission quality with some classes requiring monitoring relatively frequently and other classes requiring monitoring relatively infrequently. Alternatively, the waiting interval according to which a call is monitored may be determined on an individual cell-by-cell basis.

3 Claims, 7 Drawing Sheets

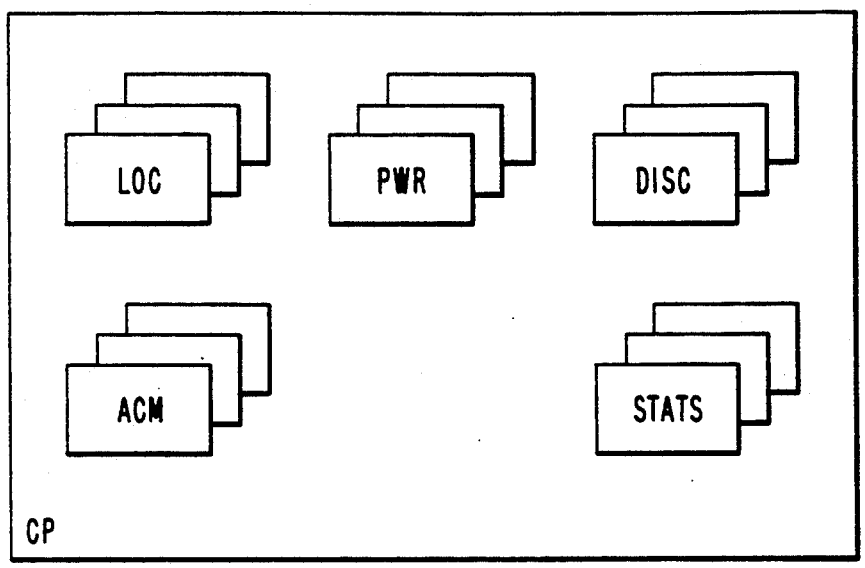
Fig. 4
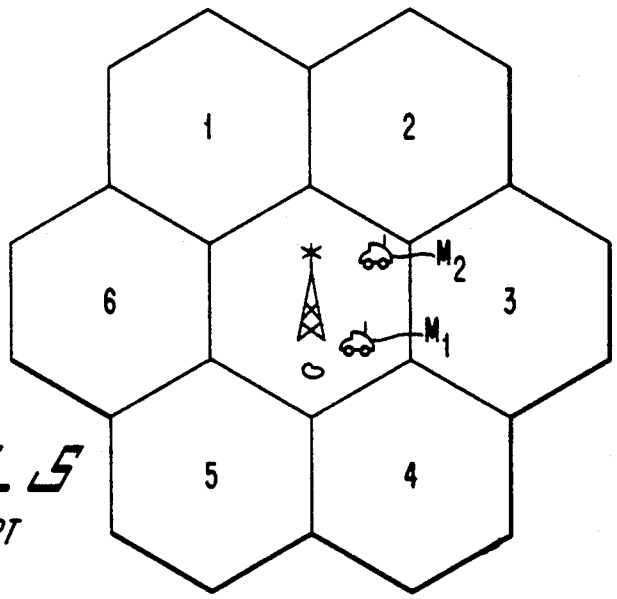
Fig. 5
PRIOR ART
| MSG. TYPE | BER OWN CH. | SS OWN CH. | SS CH 1 | SS CH n-2 | SS CH n-1 | SS CH n |
Fig. 6
PRIOR ART

ADAPTIVE RESOURCE ALLOCATION IN A MOBILE TELEPHONE SYSTEM

BACKGROUND OF THE INVENTION

The present invention relates to resource allocation in a mobile telephone system and more particularly to a method of efficiently allocating processor time in the mobile services center or base station of a mobile radiotelephone system.

Because of the mobility of transceivers in a mobile radiotelephone system, the transmission quality of calls in progress is continually varying, as with increased distance, changes in terrain, etc. In order to ensure adequate transmission quality and ultimate satisfaction of the subscriber, it is necessary to continually monitor the transmission quality of calls in progress, switching calls from one channel to another if transmission quality would thereby be improved.

Another factor affecting transmission quality is the transmission power of the various mobile stations. Transmission power is set at the mobile stations in response to commands relayed through the base station from the mobile services center or possibly originating at the base station. The power must be set at such a level as to ensure a clear signal but at the same time avoid undue interference with transmissions of other mobile stations.

The job of call monitoring to ensure high quality service is performed by the processor of the mobile services center or the base station and becomes very time consuming, especially at peak load hours when a multitude of calls are simultaneously in progress. Because of the great demands placed upon the processor's time by the call-monitoring function, it may not be feasible to realize other desirable functions and subscriber services without exceeding the processor's capacity. Using the present invention, the time demands of the call-monitoring function can be reduced such that additional processing time is then freed up to implement other desirable processing functions.

Another advantage of the present invention may be described as "optimal performance at overload peaks". Although the aim of system design always is to dimension the system in such a way that overload peaks during busy hours are avoided, almost inevitably there will sometimes be overload situations, since traffic is stochastic. In mobile telephony, the demands on software have increased more rapidly than hardware has been developed with the result that overload situations seem to be more and more frequent. Without the benefit of the present invention, all connections are caused to suffer equally from the lack of CPU power during an overload situation. Using the invention, overloads disturb the overall radio supervision performance to a much lesser extent.

SUMMARY OF THE INVENTION

According to the present invention, transmission quality of an ongoing call in a mobile radiotelephone system is monitored by measuring parameters indicative of transmission quality, evaluating transmission quality according to the measured parameters, repeatedly measuring the aforementioned parameters at intervals, and repeatedly evaluating transmission quality according to the measured parameters at a time interval variable according to the results of the previous evaluation. Effectively, the calls in progress are divided into different classes according to transmission quality with some classes requiring monitoring relatively frequently and other classes requiring monitoring relatively infrequently. Alternatively, the waiting interval according to which a call is monitored may be determined on an individual call-by-call basis.

BRIEF DESCRIPTION OF THE DRAWINGS

FIG. 4 is a block diagram of measurement handling processes in the central processor.

FIG. 5 is a plan diagram of a service area cell and its neighboring cells;

FIG. 6 illustrates a measurement result message sent from a mobile station to a base station;

DETAILED DESCRIPTION OF THE PREFERRED EMBODIMENTS

Figure 1:
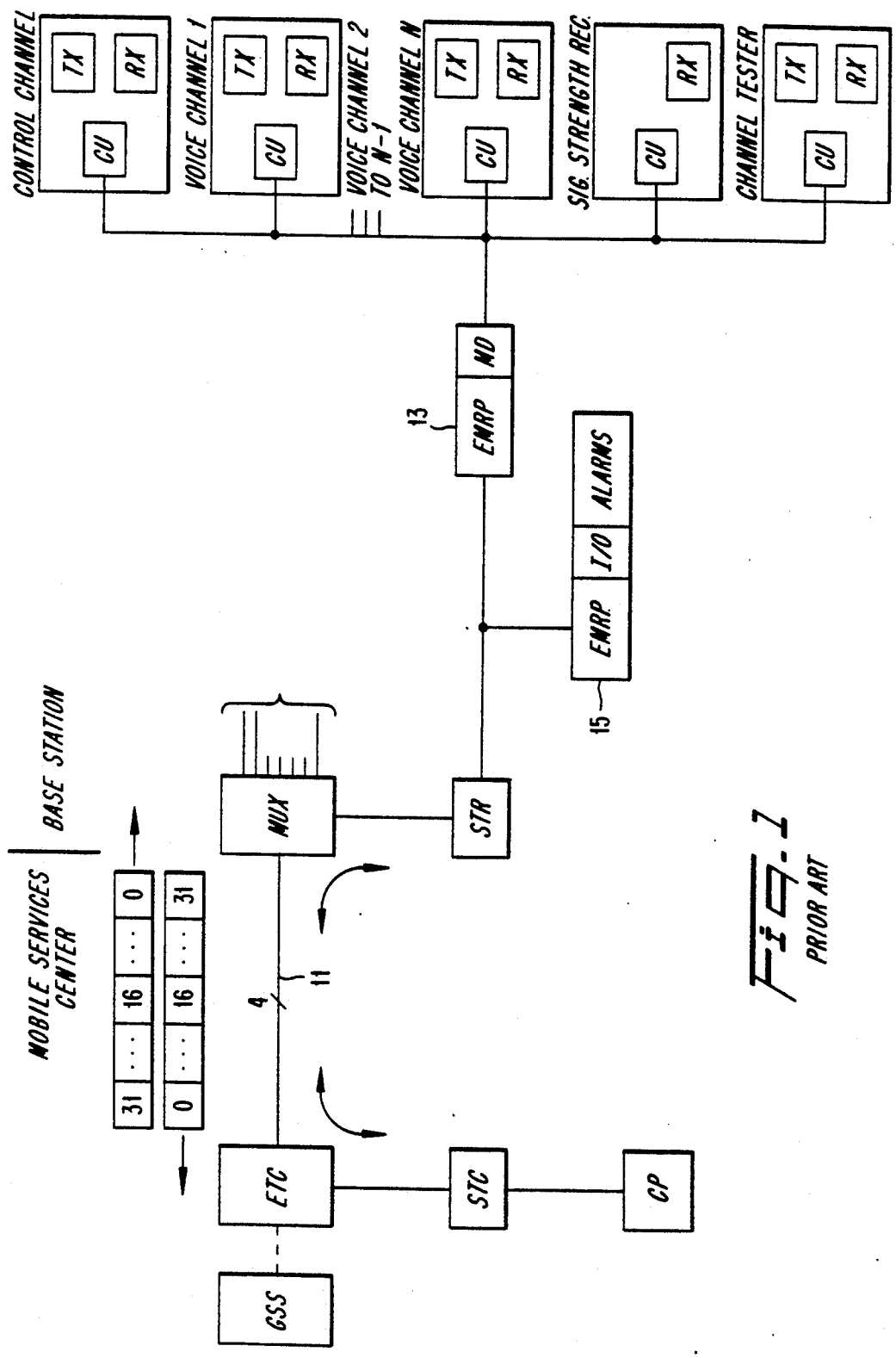
FIG. 1 is a block diagram of the hardware interface between the mobile services center and the base station in a mobile radiotelephone system.

Referring now to FIG. 1, control communications between the mobile services center and a base station of a known mobile radiotelephone system are carried out across a predetermined channel (in this instance, channel 16) of a larger number of channels (in this instance, 32) defined by respective time slots in time-division multiplex fashion and comprising a communications frame exchanged between the mobile services center and the base station on a four-wire line 11. Slot communications functions are handled by an exchange terminal circuit ETC on the mobile services center side and by a multiplexer MUX on the base station side. Data communications are formatted according to the CCITT 7 standard by a signalling terminal central STC on the mobile services center side and a signalling terminal regional STR on the base station side. Overall control of the mobile services center and the base station is performed by a central processor CP of the mobile services center. Voice communications, however, are not directly handled by the central processor CP but pass uninterrupted through the multiplexer MUX and the exchange terminal circuit ETC to a group switching subsystem GSS for proper call routing.

The base station consists principally of a number of autonomous channel units typically including a radio transmitter TX and a radio receiver RX controlled by a control unit CU. In addition to a number of voice channels, N, there is provided a control channel, a channel tester and a signal strength receiver, the last having a control unit and a radio receiver but no transmitter. The control channel is used, among other things, to set up calls across the various voice channels. The channel tester allows trouble-shooting and diagnostics to be performed under control of the mobile services center.

The switching of messages among the various control units is performed by a regional processor EMRP 13 ("extension module regional processor") in cooperation with a message distributor MD. The EMRP 13 calculates control unit addresses and scans the control units to see if a message is waiting. The message distributor puts messages into HDLC format and converts messages from parallel on the channel unit side to serial. An additional EMRP 15 is used to provide a human interface including a simple I/O terminal and various external alarms.

The operation of the signal strength receiver will now be described in detail. The function of the signal strength receiver is to allow active mobile stations in neighboring cells to be "located" in the event that call quality is so impaired as to require hand-off of the call. "Locating" may also be considered to be the process of locating the best base station to handle a call experiencing quality problems. The signal strength receiver cyclically scans all of the system frequencies. The mobile services center, however, specifically instructs the signal strength receiver to accumulate data concerning frequencies of active mobile stations in neighboring cells. The control unit of the signal strength receiver averages successive samples of these frequencies and sends measurement results to the mobile services center. In the event hand-off becomes necessary, the mobile services center can select an appropriate successor base station, typically the base station measuring the strongest signal strength on the call frequency.

Figure 2:
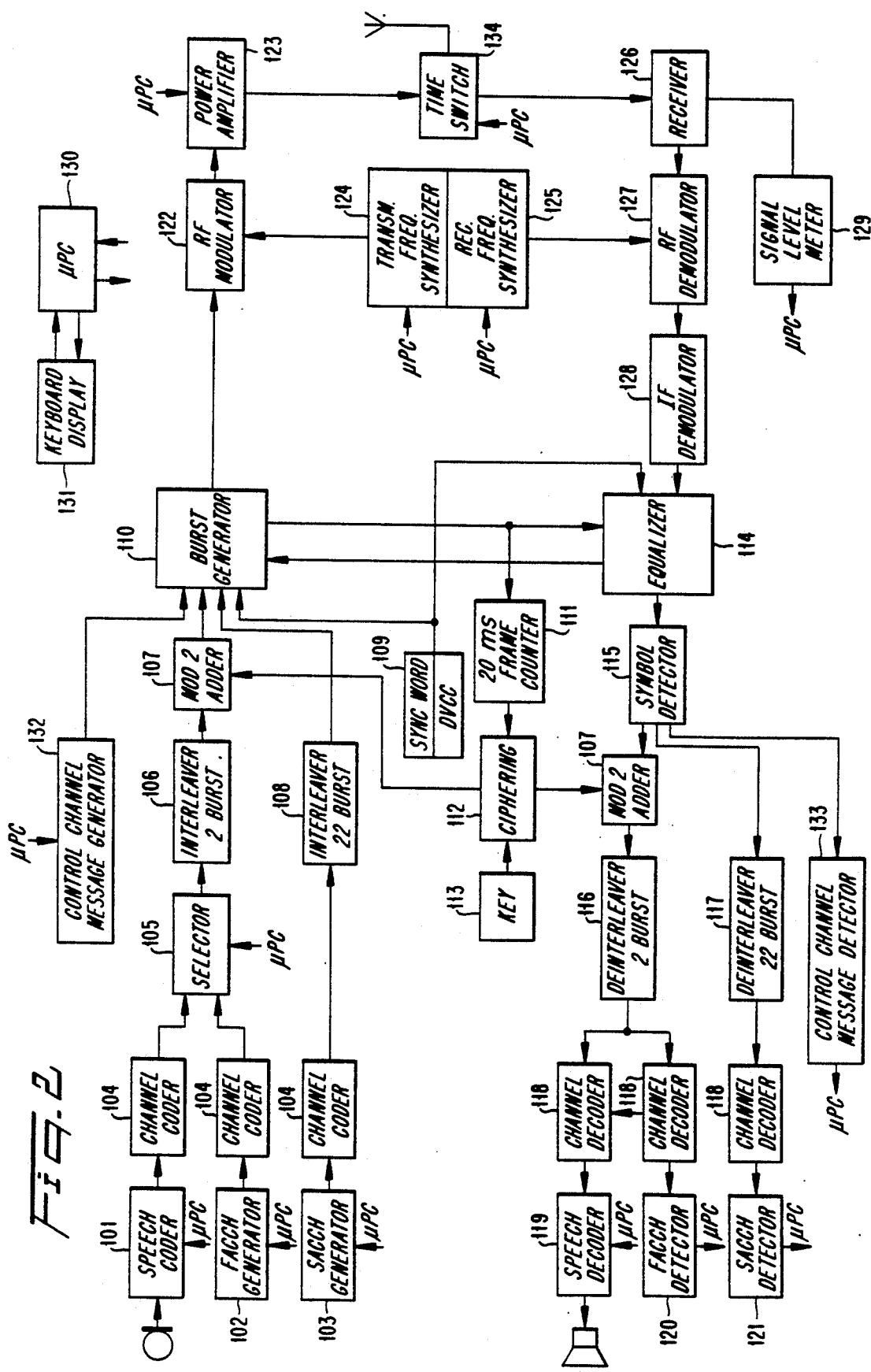
FIG. 2 is a detailed block diagram of a mobile station that may be used in conjunction with the present invention.

Referring now to FIG. 2, an embodiment of a mobile station that can be utilized in a cellular telephone system that operates in accordance with the present invention is illustrated. This particular example pertains to a mobile station that can be used in a digital communications system, i.e., one in which digitized voice information is transmitted between base and mobile stations. Furthermore, the operation of the system is explained in the context of full-rate transmissions in a time division multiple access (TDMA) system, in which each packet of digital information is interleaved over two spaced time slots in a frame of data. It will be readily appreciated, however, that the invention is equally applicable to other types of cellular radio systems, such as those in which information is transmitted in an analog format, transmitted digitally at half rate, or transmitted in other access modes such as frequency division multiple access (FDMA) or code division multiple access (CDMA).

In the mobile station depicted in FIG. 2, a speech coder 101 converts the analog signal generated by a microphone into a binary data stream. The data stream is then divided into data packets, according to the TDMA principle. A fast associated control channel (FACCH) generator 102 generates control and supervision signalling messages that are transmitted from the mobile station to the land-based system. The FAACH message replaces a user frame (speech/data) whenever it is to be transmitted. A slow associated control channel (SACCH) generator 103 provides signalling messages that are transmitted over a continuous channel for the exchange of information between the base station and the mobile station and vice-versa. A fixed number of bits, e.g., twelve, is allocated to the SACCH for each time slot of a message train. Channel coders 104 are respectively connected to the speech coder 101, FACCH generator 102, and SACCH generator 103 for manipulating the incoming data in order to carry out error detection and correction. The techniques used by the channel coders 104 are preferably convolutional encoding, which protects important data bits in the speech code, and cyclic redundancy check (CRC), wherein the perceptually significant bits in the speech coder frame, e.g., twelve bits, are used for computing a seven-bit check.

A selector 105 is connected to the channel coders 104 associated with the speech coder 101 and the FACCH generator 102, respectively. The selector 105 is controlled by a microprocessor controller 130 so that, at appropriate times, user information over a particular speech channel is replaced with system supervision messages over the FACCH. A two-burst interleaver 106 is coupled to the output of the selector 105. Data to be transmitted by the mobile station is interleaved over two time slots. A packet of 260 data bits, which constitute one transmitting word, is divided into two equal parts and is interleaved over two different time slots. The effects of RAYLEIGH fading are reduced in this manner. The output of the two-burst interleaver 106 is provided to the input of a modulo-two adder 107 so that the transmitted data is ciphered bit-by-bit by logical modulo-two-addition of a pseudo--random bit stream.

The output of the channel coder 104 associated with the SAACH generator 103 is connected to a 22-burst interleaver 108. The 22-burst interleaver 108 interleaves data transmitted over the SACCH over 22 time slots each consisting of 12 bits of information.

The mobile station further includes a Sync Word/DVCC generator 109 for providing the appropriate synchronization word (Sync Word) and DVCC (digital verification color code) to be associated with a particular connection. The Sync Word is a 28 bit word used for time slot synchronization and identification. The DVCC is an 8-bit code which is sent by the base station to the mobile station and vice-verse, for assuring that the proper channel is being decoded.

A burst generator 110 generates message bursts for transmission by the mobile station. The burst generator 110 is connected to the outputs of the module-two-adder 107, the 22-burst interleaver 108, the Sync Word/DVCC generator 109, an equalizer 114, and a control channel message generator 132, to integrate the various pieces of information from these respective units into a single message burst. For example, according to the published U.S. standard EIA/TIA IS-54, a message burst comprises data (260 bits) , SACCH (12 bits) , Sync Word (28 bits) , coded DVCC (12 bits), and 12 delimiter bits, combined for a total of 324 bits. Under the control of the microprocessor 130, two different types of message bursts are generated by the burst generator 110: control channel message bursts from the control channel message generator 132 and voice/traffic message bursts. The control channel message replaces the SACCH as well as the speech data normally generated in a voice/traffic burst.

The transmission of a burst, which is equivalent to one time slot, is synchronized with the transmission of other time slots, which together make up a frame of information. For example, under the U.S. standard, a frame comprises three full-rate time slots. The transmission of each burst is adjusted according to timing control provided by the equalizer 114. Due to time dispersion, an adaptive equalization method is provided in order to improve signal quality. For further information regarding adaptive equalization techniques, reference is made to U.S. patent application Ser. No. 315,561, filed Feb. 27, 1989, and assigned to the same assignee. Briefly, the base station functions as the master and the mobile station is the slave with respect to frame timing. The equalizer 114 detects the timing of an incoming bit stream from the base station and synchronizes the burst generator 110. The equalizer 114 is also operable for checking the Sync Word and DVCC for identification purposes.

A frame counter 111 is coupled to the burst generator 110 and the equalizer 114. The frame counter 111 updates a ciphering code utilized by the mobile station for each transmitted frame, e.g., one every 20 ms. A ciphering unit 112 is provided for generating the ciphering code utilized by the mobile station. A pseudo random algorithm is preferably utilized. The ciphering unit 112 is controlled by a key 1131 which is unique for each subscriber. The ciphering unit 112 consists of a sequencer which updates the ciphering code.

The burst produced by the burst generator 110, is forwarded to an RF modulator 122. The RF modulator 122 is operable for modulating a carrier frequency according to the $\pi/4$-DQPSK method ($\pi/4$ shifted, Differentially encoded Quadrature Phase Shift Keying). The use of this technique implies that the information is differentially encoded, i.e., 2-bit symbols are transmitted as four possible changes in phase: $\pm\pi/4$ and $\pm 3\pi/4$. The transmitter carrier frequency supplied to the RF modulator 122 is generated by a transmitting frequency synthesizer 124 in accordance with the selected transmitting channel. Before the modulated carrier is transmitted by an antenna, the carrier is amplified by a power amplifier 123. The RF power emission level of the amplifier is selected on command by a microprocessor controller 130.

A receiver carrier frequency signal is generated in accordance with the selected receiving channel by a receiving frequency synthesizer 125. Incoming radio frequency signals are received by a receiver 126, the strength of each signal being measured by a signal level meter 129. The received signal strength value is then sent to the microprocessor controller 130. An RF demodulator 127, which receives the receiver carrier frequency signal from the receiving frequency synthesizer 125 and the radio frequency signal from the receiver 126, demodulates the radio frequency carrier signal, thus generating an intermediate frequency. The intermediate frequency signal is then demodulated by an IF demodulator 128, which restores the original $\pi/4$-DQPSK - modulated digital information.

The restored digital information provided by the IF demodulator 128 is supplied to the equalizer 114. A symbol detector 115 converts the received two-bit symbol format of the digital data from the equalizer 114 to a single-bit data stream. The symbol detector 115 in turn produces three distinct output signals. Control channel messages are sent to a control message detector 133 which supplies detected control channel information to the microprocessor controller 130. A modulo-two adder 107 and a two-burst deinterleaver 116 reconstruct the speech data/FACCH data by assembling and rearranging information from two time slots of the received data. The symbol detector 115 supplies SACCH data to a 22-burst deinterleaver 117. The 22-burst deinterleaver 117 reassembles and rearranges the SAACH data spread over 22 consecutive frames.

The two-burst deinterleaver 116 provides the speech data/FACCH data to two channel decoders 118. The convolutionally encoded data is decoded using the reverse of the above-described coding principle. The received cyclic redundancy check (CRC) bits are checked to determine if any error has occurred. The FACCH channel coder furthermore detects the distinction between the speech channel and any FACCH information, and directs the channel decoders 118 accordingly. A speech decoder 119 processes the received speech data from the channel decoder 118 in accordance with a speech coder algorithm (e.g., VSELP), and generates the received speech signal. The analog signal is finally enhanced by a filtering technique. Messages on the fast associated control channel are detected by a FACCH detector 120, and the information is transferred to the microprocessor controller 130.

The output of the 22-burst deinterleaver 117 is provided to a separate channel decoder 118. A SACCH detector 121 detects messages on the slow associated control channel and transfers that information to the microprocessor controller 130.

The microprocessor controller 130 controls the mobile station activity and the base station communication, and also handles the terminal keyboard input and display output 131. Decisions by the microprocessor controller 130 are made in accordance with received messages and measurements that are made. The keyboard and display unit 131 enable information to be exchanged between the user and the base station.

Figure 3:
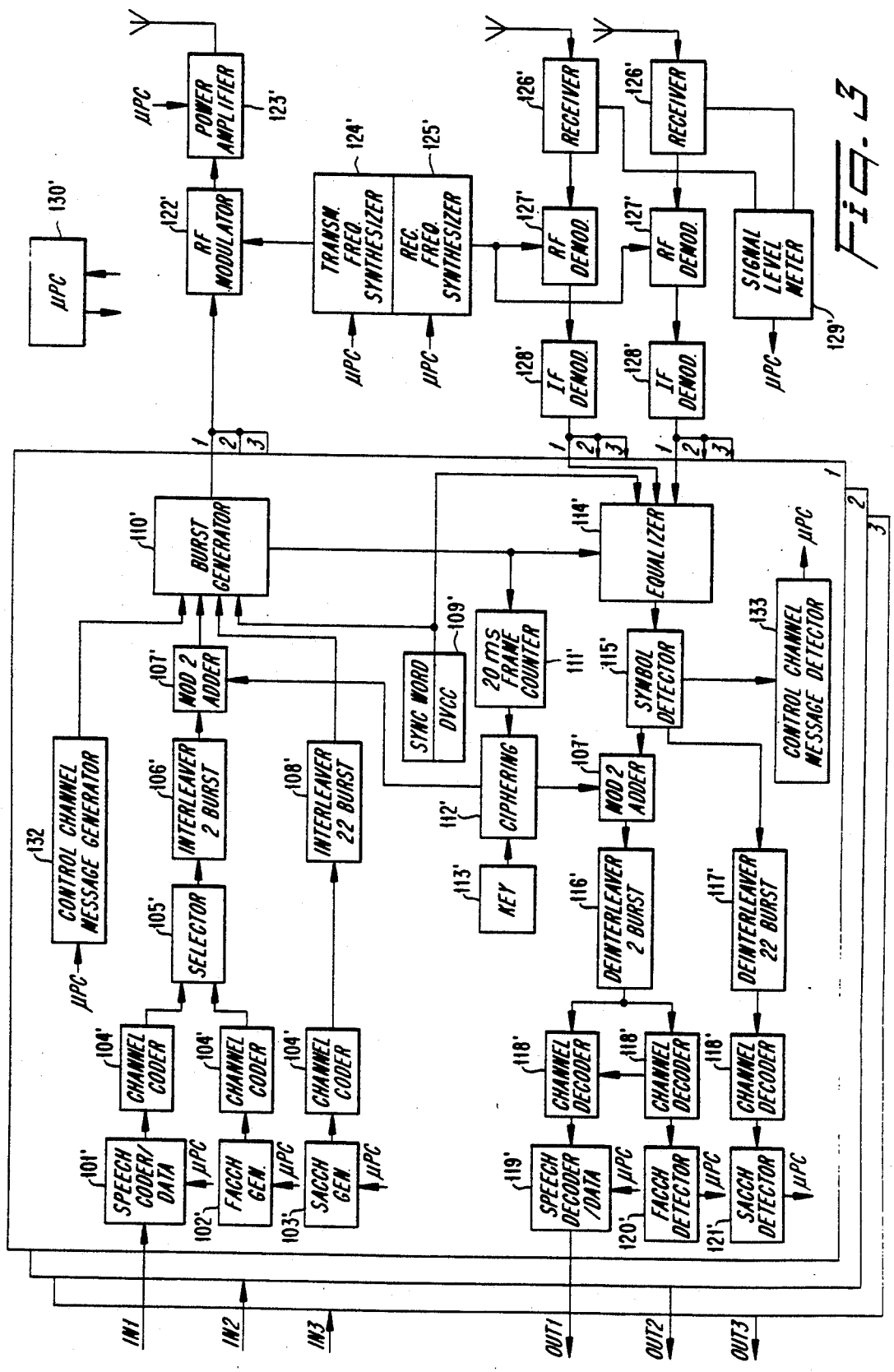
FIG. 3 is a detailed block diagram of a base station that may be used in conjunction with the present invention.

FIG. 3 illustrates an embodiment of a base station that can be utilized in a cellular telephone system that operates in accordance with the present invention. The base station incorporates numerous component parts which are substantially identical in constructions and function to component parts of the mobile station illustrated in FIG. 2 and described in conjunction therewith. Such identical component parts are designated in FIG. 3 with the same reference numerals utilized hereinabove in the description of the mobile station, but are differentiated therefrom by means of a prime (') designation.

There are, however, some distinctions between the mobile and base stations. For instance, the base station has two receiving antennas. Associated with each of these receiving antennas are a receiver 126', an RF demodulator 127', and an IF demodulator 128'. Furthermore, the base station does not include a user keyboard and display unit 131 as utilized in the mobile station.

Digital systems of the type described in connection with FIGS. 2 and 3 involve a significantly increased number of measured parameters. This by itself results in increased demands on processing power. Such a system may furthermore use mobile stations that continuously perform measurements on the control channels of neighboring base stations. Such a technique allows for improved locating as will presently be described.

In analog mobile telephony, the higher the signal strength, the higher the speech quality. This is only true in digital telephony to a limited extent; when all bit errors can be corrected, an additional increase of signal strength will not give rise to any improvement in speech quality. In fact, even when this sufficient signal strength level is reached, there may still be reason for handoff.

If the locating algorithm indicates that the same speech quality may be obtained by using a neighboring base station but at a lower power level, a change to the neighboring base station will be beneficial. If all mobiles strive for sufficient speech quality at minimum power level, the total transmitting power in the network will be decreased. This decrease in total transmitting power, especially in high-density traffic areas, will lead to an improved C/I (carrier-to-interference) ratio, which results in better radio performance overall.

In a proposed digital system, for example, the locating algorithm continuously calculates the expected power decrease that a handoff would give for each of the surrounding base stations (up to a maximum of 32) while still maintaining sufficient speech quality. This is done by comparing the received signal strength measured by a mobile station with the known transmitted output power from the base station in question to arrive at a measure of "path loss" or "distance attenuation". For example, the mobile station measures the downlink (base station to mobile station) quality and signal strength on the current connection, as well as the signal strength from surrounding base stations. In addition, the base station measures the uplink quality and signal strength as received from the mobile station. About twice a second, these measurements are reported to the base station. The measurements are evaluated through the use of extensive algorithms. Occasionally, the results of these evaluations may be, for example, a handoff of the mobile station to another base station, or a power change order sent to the mobile station.

Therefore, whereas the more conventional approach to locating and handoff simply attempts to maintain good quality, a more recent approach is to maintain good call quality at minimum transmitting power. This new strategy (continuous evaluation) obviously requires more processing power, especially when the number of surrounding base stations is high. Even the more conventional approach to locating and handoff will involve increasingly extensive computations as the number of measured parameters increases in the transition from analog to digital systems. The present invention may therefore be used to advantage in all types of radiotelephone systems both analog and digital, including both systems designed to maintain good call quality at minimum transmission power and systems designed to maintain good call quality only.

The measurement handling functions of the central processor may be realized using several different measurement handling processes as illustrated in FIG. 4. Each process is duplicated for each active connection.

An active channel measurement handling process ACM receives the contents of a measurement result message from each active mobile station about twice a second. The measurement result message may have the form illustrated in FIG. 6, for example. Following a field identifying the type of message as a measurement result message, measured bit error rate (BER) and signal strength (SS) for the connection's own channel is presented in a pair of fields, after which signal strength only of n additional channels is presented in n equal-length fields. The status of the data is interpreted and stored for each message. The 64 most recent data generations are stored.

A locating process LOC requests data (for one or more generations) from ACM. The measurements are processed. When found suitable, a handoff to another connection is proposed to the call handling function in the central processor.

A power regulation process PWR requests data (for one or more data generations) from ACM. The measurements are processed. When found suitable, a new transmitting power is sent to the mobile station.

A disconnect proposal process DISC requests data (for one or more data generations) from ACM. The measurements are processed. When found suitable (for example, when the mobile station is lost or not acting properly), an abortion of the current connection is proposed to the call handling function in the central processor.

In addition, recording and statistic functions may be activated for some connections/cells using a statistics process STATS.

According to the foregoing arrangement, since numerous parameters must be stored and evaluated for each busy system channel, the channel monitoring task becomes a significant burden on the central processor CP of the mobile services center. At peak demand hours, for example, the mobile services center may supervise hundreds of calls in progress simultaneously, resulting in thousands of signal strengths to be continually updated and evaluated.

The present invention alleviates the aforementioned processing burden by recognizing that not each channel requires equal monitoring and by allocating processor monitoring time on the basis of need rather than indiscriminantly. For example, referring to FIG. 5, the channel used by a mobile $M_1$ in the immediate vicinity of the base station will inevitably require less monitoring attention than a channel used by a mobile station $M_2$ located near the cell border.

Figure 7:
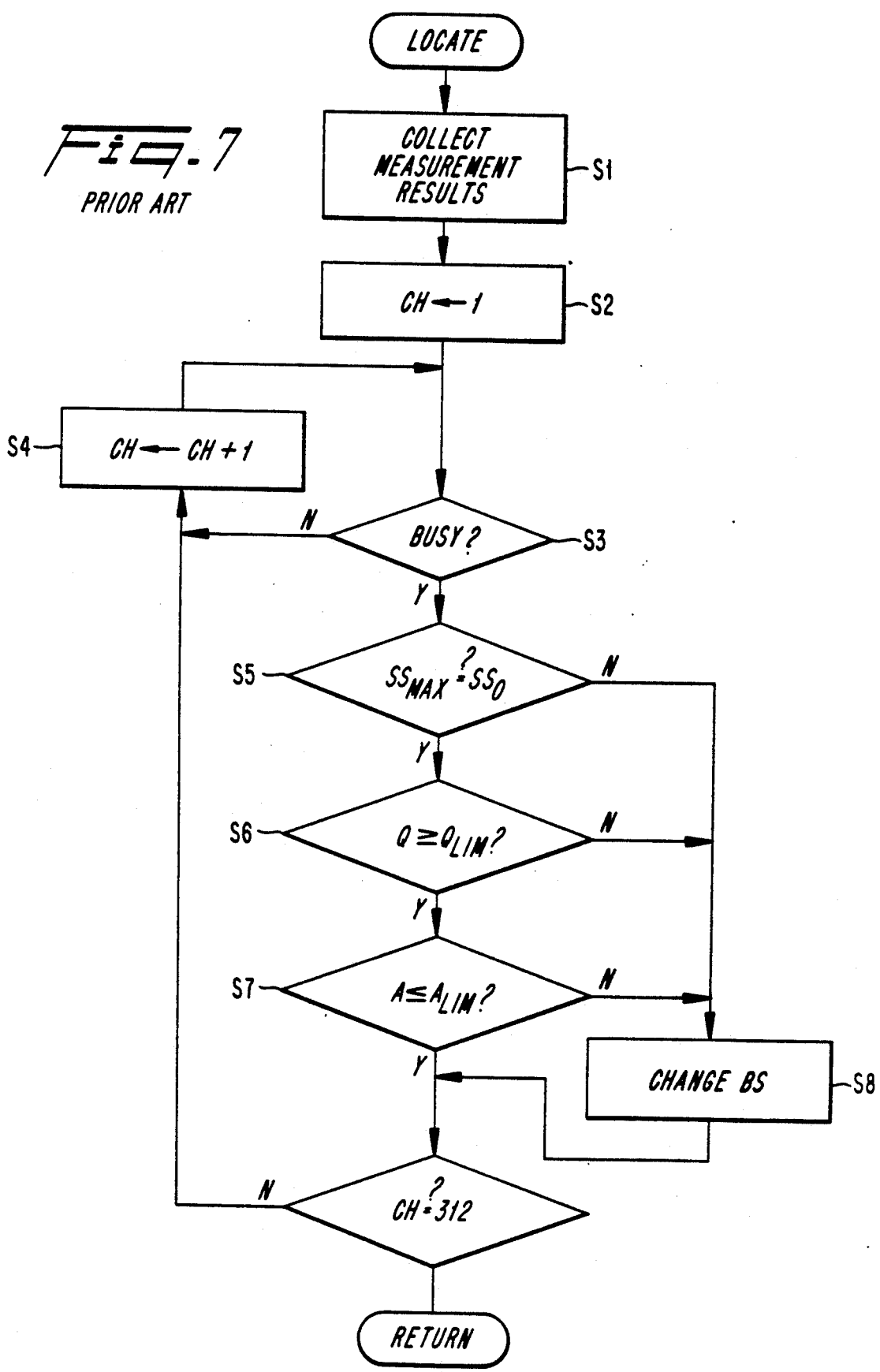
FIG. 7 is a flowchart representation of a routine used to locate the best channel for carrying an ongoing call according to the prior art.

The improvement of the present invention may be better appreciated with reference to FIG. 7, representing the locating function performed by the central processor CP of the mobile services center or the base station in a conventional mobile radiotelephone system. In a first step S1, signal strengths and associated parameters are collected from the signal strength receivers and voice channel units. In steps S2–S4, each of the channels is monitored in turn, and if the channel is busy, it is ascertained whether the maximum signal strength is that of the base station presently handling the call or of another base station (step S5). If reception at another base station is clearer than at the base station presently handling the call, then the call will be handed off to the better qualified base station if possible in step S8. Also, even if signal strength is maximum at the base station presently handling the call, if the quality Q of the call is not greater than a minimum acceptable quality $Q_{lim}$, or if the distance of the mobile from the base station is greater than a maximum acceptable distance $A_{lim}$, then the call will also be handed off. This procedure is repeated for each of the channels (for example, 312 voice channels), and the locating routine then runs to completion.

In one embodiment of the present invention, on the other hand, channels are placed in different classes depending on the previously-noted characteristics of the channel. Whether or not hand-off is required is evaluated at different time intervals for the different classes. Initially, all of the channels may be placed in a first class having the shortest evaluation time.

Figure 8:
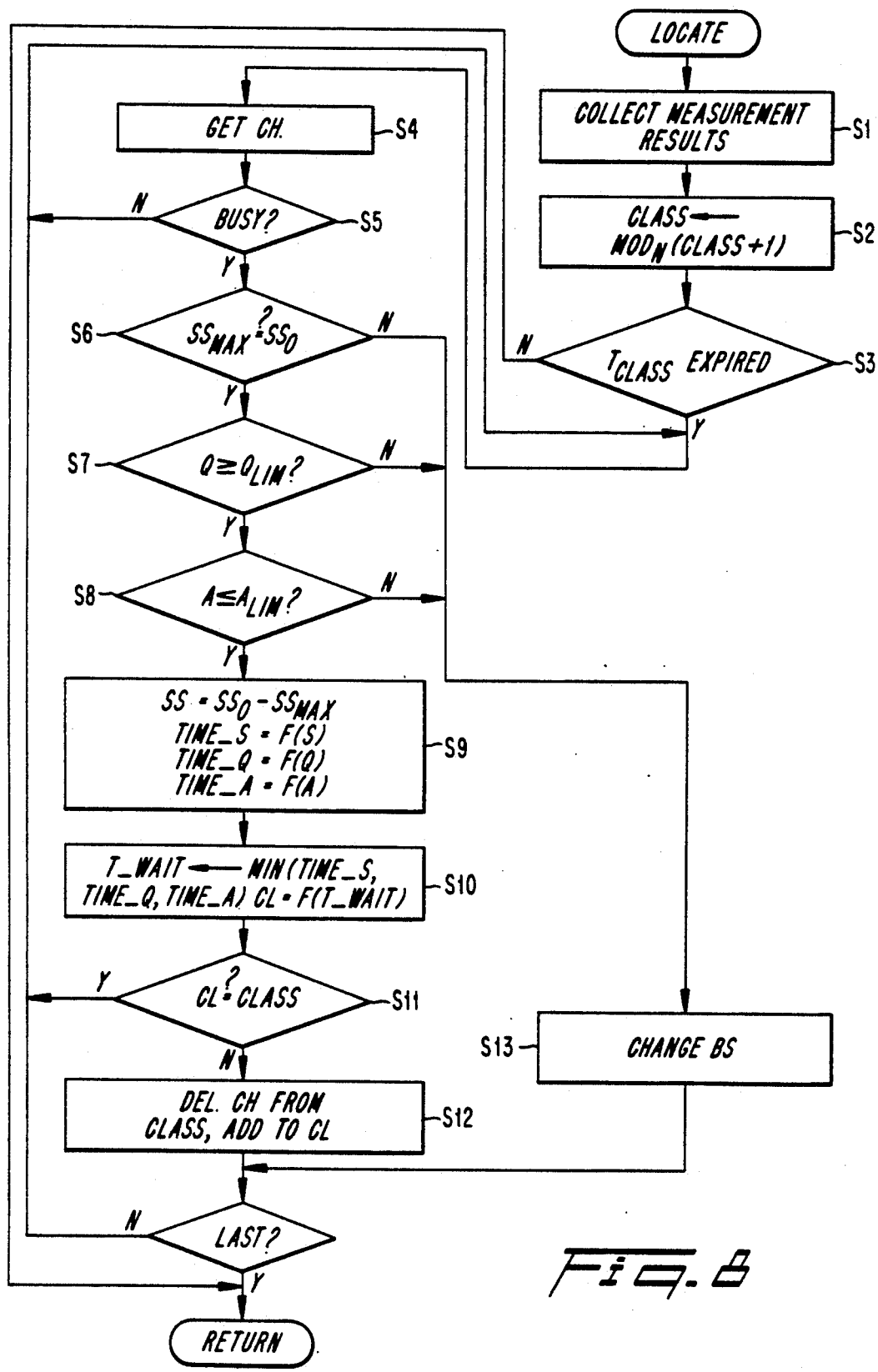
FIG. 8 is a flowchart representation of such a routine modified according to the present invention.

Referring now to FIG. 8, in a first step S1, signal strength and associated information is collected as in the prior art. In steps S2 and S3, however, one of the designated classes of channels is chosen in its given turn and it is determined whether the evaluation time $T_{class}$ has expired. If the time has not yet expired, the routine immediately runs to completion. If the evaluation time has expired, stored data relating to the first channel in a list of channels in that particular class is retrieved and the activity status of the channel is checked (steps S4 and S5). If the channel is busy, identical tests are conducted in steps S6–S8 as in the prior art routine. At the end of the tests, however, the composition of the channel list is adjusted as necessary.

In steps S9, a difference is formed between the signal strength of the channel at the base station handling the call and the maximum signal strength. Based on the difference S, a time interval TIME_S is determined as a function of S. The function may be a linearly increasing function or may be a stepwise increasing function. Similarly, time intervals TIME_Q and TIME_A are determined as functions of call quality Q and the mobile station distance A. An optimum waiting time between evaluations of that particular channel is then determined as the minimum of TIME_S, TIME_Q, and TIME_A in step S10. The channel is then assigned to a class as a function of the optimum waiting time T_WAIT. If the assigned class CL is the same as the channel's present class CLASS, as determined in step S11, the next channel on the list is then retrieved. Otherwise, the channel is deleted from its present class and added to its newly assigned class in step S12. In like manner, when calls are first initiated they are added to a first class having a shortest waiting time, and when calls are terminated, the corresponding channel is deleted entirely from the class lists. When the last channel in the list has been processed as determined in step S14, the locating function then runs to completion. At a next iteration, a subsequent class having a greater waiting period is then processed.

Instead of grouping calls into classes according to their need for monitoring and evaluation, it may be preferable for each connection to be supervised autonomously on an individual basis. In this instance an evaluation time T_WAIT may be associated with each connection. The evaluation times may be timed using a timer module to notify the processor when each connection is to be evaluated.

System performance may be further improved by considering other factors besides radio measurements in allocating processor time. Actual processor load may be considered such that during low traffic, the few connections active can all use a short T_WAIT value unconditionally, as there is no need to cut down processor load. Another consideration may be cell type. For some cell types, radio transmission quality can deteriorate more rapidly than for other cell types. For example, in the center of large metropolitan areas, "street corner effects" can be expected whereby transmission quality may be significantly affected by a change in direction by a mobile station. For more trouble-prone cell types, T_WAIT values should be restricted to shorter values (more frequent monitoring) than might be the case otherwise.

Figure 9:
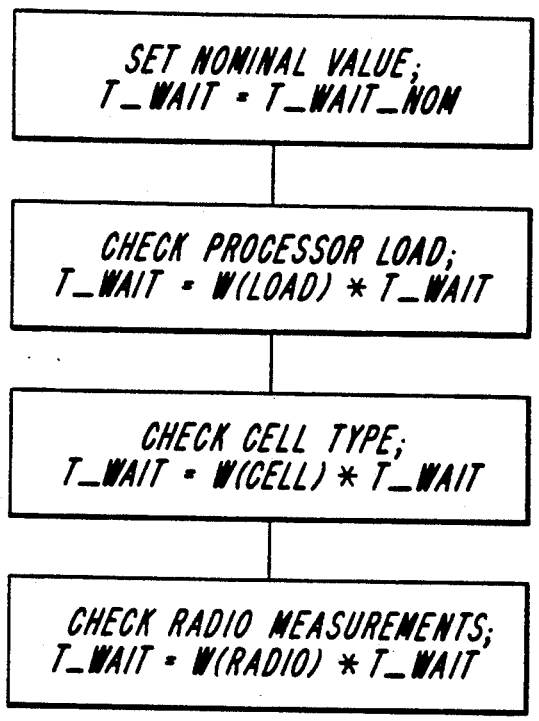
FIG. 9 is a flowchart illustrating how a monitoring interval for a call connection may be adaptively set according to several different factors.

The details of how such a strategy may be implemented will now be described. Referring to FIG. 9, the monitoring interval T_WAIT for a call connection may be set according to the factors just mentioned. The first step is to assign a nominal value of T_WAIT, T_WAIT_NOM. This value is then multiplied in three steps by weight functions corresponding to processor load, cell type, and radio conditions, respectively. These weight functions are assigned values in the following manner.

To assign an appropriate weight value to account for actual processor load, the current processor load is read from the system. Processor load may be monitored, for example, by timing processor idle time during a given interval. The weight value is then assigned according to the weight function $$W(\text{load}) = (\text{current processor load}(\%)/80)^2,$$

where the power of two ensures that during low traffic the T_WAIT period is kept sufficiently short. Assuming processor load will vary between 10%–100%, the interval of W(load) will thus be:

Possible W(load) values: (0.016 ... 1.56).

As previously mentioned, one problem to be considered is that in some cells measurement data can change rapidly. For example, in the case of a cell consisting of one street, suddenly traveling around a corner results in a more or less instant drop in signal strength. In cells of this type (with a high risk of fast changes in measurement data), the use of high 'T_WAIT' values is restricted. For this purpose, a "Cell Type" parameter may be used. This parameter denotes the probability of fast changes in reported measurement data for the current cell (that is, fast compared to the time over which measurement data are averaged). To assign an appropriate weight value to account for cell type, a straight-forward method is to classify the cell type in one of (say) five classes, indicating a range from "very low probability for fast changes" to "very high probability for fast changes". Weight values to account for cell type may be set within a range as follows:

Possible W(cell) values: (0.5 ... 2)

In some instances, the aforementioned "Cell Type" parameter may be realized in conjunction with another parameter. In the Ericsson CME20 mobile radiotelephone system implementation, for example, there is already a parameter type reflecting the cell characteristic indicated above, namely weighting parameters intended for locating averaging. The most recent samples are multiplied by associated weighting values. For example, averaging (e.g., of signal strength) may be performed over the five most recent samples. In a cell where no fast changes in signal strength are likely to happen (e.g., a flat call with no obstructive objects), a set of equal weighting parameters (1/5, 1/5, 1/5, 1/5, 1/5) might be appropriate. This indicates that all samples are given the same weight. In a cell where fast changes of signal strength are likely to happen (e.g., a "street cell"), the system has to react very fast to changes, applying an extra weight to the most recent measurement samples. This is achieved by setting parameter values to ($\frac{1}{4}$, $\frac{1}{4}$, $\frac{1}{4}$, 1/16, 1/16) for example. This weighting represents a "stiff" parameter setup, stressing the importance of the most recent samples.

Determining a weight function to account for radio measurements is somewhat more involved. In a proposed digital system, a handoff to a new cell may be attempted for any of the following reasons: a better cell for handling the call has been found, call quality has unacceptably deteriorated, or the distance of the mobile station and the base station has become too great.

Whenever a neighboring cell is found to be significantly superior to the current cell, a handoff is attempted. The comparison is made using a proper unit, such as path loss or signal strength. A weight value W(better cell) is chosen, proportional to the difference between current cell and the best neighboring cell. The value is chosen in the interval (0.5 ... 2.0). Thus, if the gap to the second best cell is very large, the result is W(better cell)=2.0.

When the quality of the current connection, determined from the bit error rate, has fallen below a certain limit (preset by operator), a handoff is attempted. A weight value W(bad quality) is chosen, proportional to the difference between actual measured quality and the present alarm limit. The value is chosen in the interval (0.5 ... 2.0). Thus, if the gap to the alarm limit is very large, the result is W(bad quality)=2.0.

When the actual distance between the mobile station and the base station, determined from the timing advance information field, has exceeded a limit (preset by the system operator), a handoff is attempted. A weight value W(distance) is chosen, proportional to the difference between actual measured distance and the preset alarm limit. The value is chosen in the interval (0.5 ... 2.0). Thus, if the gap to the alarm limit is very large, the result is W(distance)=2.0.

The final value of W(radio) is then selected in the following way with a value range of 0.5 to 2.0:

$$W(radio)=MIN(W(better)\ W(quality)\ W(distance)).$$

The total value range for T_WAIT is therefore:

$$T\_WAIT(min)=(0.016) * (0.5) * (0.5) * (0.5) * T\_WAIT\_NOM$$

$$T\_WAIT(max)=(1.56) * (2.0) * (2.0) * (2.0) * T\_WAIT\_NOM$$

Assuming a nominal T_WAIT value of 200 ms at a processor load of 80% (T_WAIT_NOM=200 ms), the value range will be:

$$T\_WAIT(min)=0.002 * 200\ ms=0.4\ ms$$

$$T\_WAIT(max)=12.5 * 200\ ms=2.5\ s$$

An example of the operation of measurement processes for call monitoring according to the present invention will now be given with reference again to FIG. 4. In this example, different evaluation times are set for each active connection. For each active connection, measurement handling comprises the following steps:

| | |
|---|---|
| (1) RECEIVE MEASUREMENT DATA<br>UNPACK DATA<br>CHECK STATUS OF DATA<br>STORE DATA | (ACM) |
| (2) FETCH MEASUREMENT DATA FROM ACM<br>EVALUATE DATA<br>(POSSIBLE) ACTIONS | (LOC, PWR, DISC) |

The "service" function, ACM, receives measurement result data at a rate of about twice per second. When data are unpacked, checked and stored, ACM does nothing besides keep the data available, waiting for the next measurement result message to arrive.

The "user" functions (LOC, PWR and DISC), related to the same connection as ACM above, are not synchronized to either ACM or each other. That is, LOC, for example, does not know when new data has arrived at ACM. This implies that after an evaluation, LOC has to decide by itself at which time the next request for data shall be sent to ACM. The same applies to PWR and DISC.

This time delay until the next data request is the time T_WAIT referred to. If the waiting interval is too short, the probability that new measurement data has arrived at ACM is low, and an unnecessary processor load is caused. If the waiting interval is too long, an undesired delay is caused which can be critical in the instance of handoff or power regulation decisions.

Figure 10:
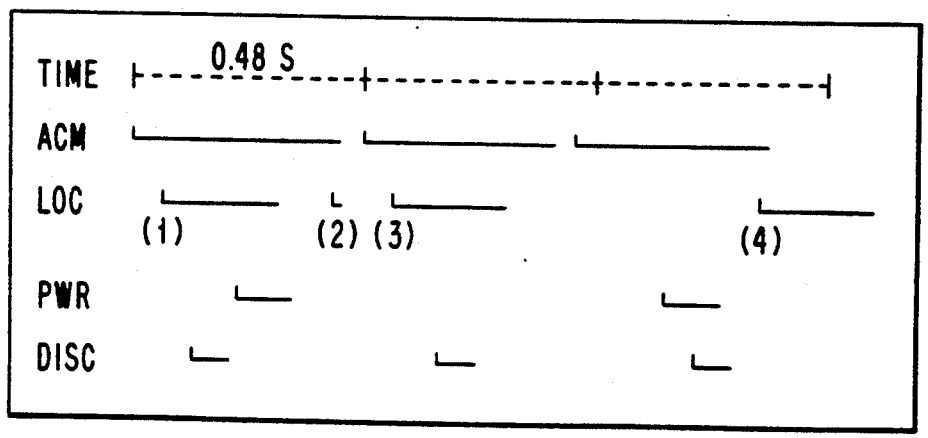
FIG. 10 is a timing diagram illustrating operation of measurement handling with a monitoring interval being adaptively set.

FIG. 10 exemplifies timing for processes related to one connection. In the FIGURE, the character "⌊" indicates, with respect to ACM only, that a new message with data has arrived from the measurement result process. With respect to LOC PWR and DISC the character "⌊" indicates a time at which new measurement data are requested from ACM; if new data has arrived since the last requested time, they are returned to the requesting process. For the purposes of illustration, the example follows the LOC process. At time=(1), the LOC function gets new data. After evaluation, these data indicate a not-too-perfect radio connection. To avoid delay, LOC decides to check for new data already at Time=(2); i.e., after a short delay T_WAIT. However, at Time=(2), no new data has been received by ACM. This is observed by LOC. The Delay T_WAIT is kept short. At Time=(3), new measurement data are received. An evaluation of these new data indicates, however, that the current radio connection has recovered. Thus, LOC decides to increase the value of T_WAIT. At Time=(4), a request for new data is sent to ACM.

According to the foregoing method, processor time is conserved without being expended unnecessarily evaluating strong channels, or equivalently, processor time is allocated to tasks for which it is most needed, namely evaluating weak channels. Saved processor time may therefore be used to realize additional system functions aside from maintaining high sound quality throughout the system. The same method may be used to advantage in connection with any function applied to the voice channels of a mobile radiotelephone system using the processor capacity of the mobile services center.

The "T_WAIT" method detailed above is most effective in applications where signalling is reasonably cheap (in terms of consumed CPU time). Otherwise, short "T_WAIT" times will lead to extensive signalling, which itself becomes a load problem. In situations where extensive signalling is undesirable, an alternate approach may be used to advantage. This may be the case, for example, in the European GSM system.

In the approach detailed above, locating and power regulation are performed by processes running asynchronously with respect to each other, each responsible for fetching its own measurement data from the ACM process. An alternative approach is to merge together ACM, LOC, and PWR into one process obviating the need for signalling between processes. When measurement data arrives from the radio base station, the ACM part of the process is executed. When this part of the process is completed such that measurement data are unpacked and stored, execution of the LOC part follows. LOC may now be used to make an evaluation of measurement data if necessary. However, it may also be decided in LOC to skip this evaluation (or even more evaluations), if the radio situation is considered stable. In this case, the execution of PWR starts, etc.

By deciding for how many measurement generations including the current generation that evaluation can be skipped, basically the same result is achieved as when the "T_WAIT" technique is used. The difference is that the waiting time is expressed, for example, in terms of "skip evaluation for the next four measurement generations" instead of "set T_WAIT value equal to two seconds" as described above. The basic principle in either implementation remains letting the urgency of measurement evaluation reflected in a waiting time value. However, the actual environment (hardware, operating system) will of course be reflected in the actual details of implementation as will be apparent to one of ordinary skill in the art.

It will be appreciated by those of ordinary skill in the art that the present invention can be embodied in other specific forms without departing from the spirit or essential character thereof. The presently disclosed embodiments are therefore considered in all respects to be illustrative and not restricted. The scope of the invention is indicated by the appended claims rather than the foregoing description, and all changes which come within the meaning and range of equivalents thereof are intended to be embraced therein.

What is claimed is:

1. A method of monitoring and altering transmission quality of a call in a mobile radiotelephone system, comprising the steps of:
   measuring properties of a radio channel carrying said call at a plurality of receiver sites to yield a plurality of measurements;
   evaluating said measurements;
   repeating said measuring step at intervals;
   repeating said evaluating step at a variable time interval equal to the smallest time value of a set comprising a first time value determined as a function of a measurement indicative of quality of reception at a receiver site presently handling said call, a second time value determined as a function of a measurement indicative of a distance of a mobile station party to said call from said receiver site presently handling said call, and a third time value determined as a function of a difference between a signal strength measurement at said receiver site handling said call and a greatest signal strength measurement at the remaining receiver sites; and
   issuing a command to alter said transmission quality responsive to said evaluating step.

2. An apparatus for monitoring and altering transmission quality of a call in a mobile radiotelephone system comprising:
   means for measuring properties of a radio channel carrying said call at a plurality of receiver sites to yield a plurality of measurements;
   means for evaluating said measurements;
   means for repeating said measuring step at intervals;
   means for repeating said evaluating step at a variable time interval equal to the smallest time value of a set comprising a first time value determined as a function of a measurement indicative of quality of reception at a receiver site presently handling said call, a second time value determined as a function of a measurement indicative of a distance of a mobile station party to said call from said receiver site presently handling said call, and a third time value determined as a function of a difference between a signal strength measurement at said receiver site handling said call and a greatest signal strength measurement at the remaining receiver sites; and
   means for issuing a command to alter said transmission quality responsive to said evaluating step.

3. A method of monitoring and altering transmission quality of a call in a mobile radiotelephone system, comprising the steps of:
   measuring quality of reception of said call at a cell receiver presently handling said call and at a plurality of neighboring cell receivers;
   determining a distance between a mobile station party to said call and said cell receiver presently handling said call;
   evaluating:
      whether quality of reception is better at a neighboring cell receiver;
      whether quality of reception at said cell handling said call is unacceptable; and
      whether said distance between said mobile station party to said call and said cell receiver presently handling said call is greater than a predetermined limit;
   repeating said measuring step at intervals;
   repeating said evaluating step at a variable time interval equal to the smallest time value of a set comprising a first tie value determined as a function of said quality of reception at said cell receiver presently handling said call, a second time value determined as a function of said distance of said mobile station from said cell receiver presently handling said call, and a third time value determined as a function of a difference between quality of reception at said cell receiver handling said call and a highest quality of reception at the neightboring cell receivers; and
   issuing a command to alter said transmission quality responsive to said evaluating step.

* * * * *